(12) United States Patent
Lawrenson et al.

(10) Patent No.: US 6,293,416 B1
(45) Date of Patent: Sep. 25, 2001

(54) FLAT PACK BOX

(75) Inventors: Arthur John Lawrenson, Nottinghamshire; James Rothwell Lee, Nottingham, both of (GB)

(73) Assignee: Poletech Systems Limited, Newark (GB)

( * ) Notice: Subject to any disclaimer, the term of this patent is extended or adjusted under 35 U.S.C. 154(b) by 0 days.

(21) Appl. No.: 09/424,804

(22) PCT Filed: May 28, 1998

(86) PCT No.: PCT/GB98/01562

§ 371 Date: Jan. 27, 2000

§ 102(e) Date: Jan. 27, 2000

(87) PCT Pub. No.: WO98/54805

PCT Pub. Date: Dec. 3, 1998

(30) Foreign Application Priority Data

May 29, 1997 (GB) .................................................. 9710951

(51) Int. Cl.[7] .................................................... B65D 6/26
(52) U.S. Cl. ........................................ 220/4.34; 220/4.33
(58) Field of Search .................................. 220/4.28, 4.29, 220/4.33, 4.34, 6, 7, 683, 685, 692, 693

(56) References Cited

U.S. PATENT DOCUMENTS

| 3,073,476 | * | 1/1963 | Heacock . |
| 4,266,670 | | 5/1981 | Mykleby . |
| 4,829,977 | * | 5/1989 | Valentine . |
| 6,216,872 | * | 4/2001 | Haasbroek . |

FOREIGN PATENT DOCUMENTS

| 93 07 001 | | 7/1993 | (DE) . |
| 42 06 682 | | 9/1993 | (DE) . |
| 1452042 | * | 8/1966 | (FR) . |
| 1163354 | * | 9/1969 | (GB) . |
| 1 444 806 | | 8/1976 | (GB) . |
| 2 205 085 | | 11/1988 | (GB) . |
| 2 270 709 | | 3/1994 | (GB) . |
| 2 291 687 | | 1/1996 | (GB) . |
| 2 301 848 | | 12/1996 | (GB) . |
| 2 304 689 | | 3/1997 | (GB) . |
| 2 324 324 | | 10/1998 | (GB) . |

OTHER PUBLICATIONS

Krone, Kabelverzweigergehäuse Aus Kunststoff Berlin.

* cited by examiner

*Primary Examiner*—Stephen Castellano
(74) *Attorney, Agent, or Firm*—Holland & Knight LLP

(57) ABSTRACT

The invention provides a box comprising four side panels which are injection molded from a suitable rigid plastic material and further comprises a plurality of complementary locating members integrally molded with the first and second sides of the wall member.

21 Claims, 4 Drawing Sheets

FLAT PACK BOX

Priority is claimed under 35 U.S.C. § 119 to PCT/GB98/01562, filed May 28, 1998, which corresponds to GB 9710951.6 filed May 29, 1997.

The invention relates to flat pack boxes, especially boxes made by injection moulding plastics material, particularly, though not exclusively to flat pack boxes for use as access chambers e.g. for cable television or for street furniture such as pole mounting sockets, traffic lights, bollards, signs and associated cables.

When assembled, these boxes have to be rigid and to be able withstand substantial loads, for example up to at least 12.5 tonnes, a requirement for access chambers for cable television and other utilities, which often are placed in the roadway or pavement. The assembled boxes are positioned in the ground to form access chambers for connections between main underground electric cables and distributor cables to adjacent premises or for street furniture. It is desirable for the boxes to be packed flat for transportation and storage as the assembled boxes are large.

Presently available flat pack boxes comprise a one piece box that can be unfolded and erected to form a rigid access chamber or box.

It is desirable to have different sizes of box available for different applications. There are practical limits to the size of box which can be moulded from plastics material. To overcome this, it is sometimes desirable to construct the boxes modularly to make different sizes of box from a single unit. However, satisfactory, modular flat pack boxes, presently are not available.

It is an object of the invention to provide a flat-pack box made from moulded plastics material that has substantial strength, particularly in a vertical direction. It is a further object of the invention to provide a box that is sufficiently rigid when assembled. Another object of the invention is to provide a box that can be assembled simply and easily on site without special tools or fittings. Yet another object is to provide a box that is suitable for modular assembly.

The invention provides a flat-pack box comprising a plurality of panels moulded from plastics material and a plurality of peg members, each panel comprising:

a wall member comprising a front face, a rear face, a top, a bottom, a first side and a second side; and at least one complementary locating member forming a channel for locating a peg member therein on each of the first and second sides of the wall member;

characterised in that the locating members comprise a U-shaped member having a first side integrally moulded with a side of the wall member, a second side opposed to the first side, a back face and an open front face and wherein the locating member further comprises a tab integrally moulded with at least one side of the U-shaped member and extending across the open front face of the locating member and the back face has a cut out section opposed to the tab and of at least the same dimensions as the tab.

Advantageously the peg members are injection moulded of suitable rigid plastics material but they may be made in any suitable manner. For example, the peg members may be fabricated from a suitable metal e.g. steel.

Advantageously the complementary locating members each comprise a channel of square or rectangular cross-section, though any suitable cross-section may be used.

Advantageously the tab is integrally moulded with both sides of the U-shaped member. Alternatively the tab may extend only part way across the front face of the U-shaped member. In this arrangement, the tab advantageously extends further across the open front face than the width of the side of the wall member so that the wall member does not slip into the void of the U-shaped member.

Preferably the cut out section in the back face of the U-shaped member is of the same dimensions as the tab. Alternatively, it may be larger than the tab.

Preferably the side walls of the U-shaped member are set back from the face of the wall member to which the tab is adjacent by the depth of the tab.

Preferably the peg members each comprise an elongate rigid member that extends through a plurality of locating members. Advantageously the peg members may have a point at the base and a corresponding socket at the top. Thus, when one peg is positioned on top of another peg the point of one peg fits into the socket on the other peg and load on the box is transferred effectively through the pegs. Advantageously the locating members further comprise peg retaining members, such as one or more ridges integrally moulded in the interior of the locating members. Advantageously the peg members each comprise a plurality of cross pieces that coact with the peg retaining members to hold the peg in the locating members, so that it does not slip out when in use. The cross pieces also act to rigidify the peg members.

The peg members advantageously each comprise two side pieces and a plurality of cross pieces at right angles forming square or rectangular sections or diagonally forming triangular sections between the side pieces.

If the panels are to be used to make modular boxes of different heights, where the third and fourth sides respectively are positioned at the top and bottom, preferably one or more of the panels further comprise a plurality of complementary locating members on the top and bottom of the wall member. Alternatively the panels may comprise locating lugs and complementary slots in the top and bottom of the wall member.

Alternatively heights may be varied by making suitable extension assemblies e.g. wing panels which can be assembled in the same way as the box to make an extension assembly of the same size as the boxes. In this case the panels may be made to form a gallery at the bottom edge portion, within which an upper edge portion of the extension assembly may be received to locate the assembly with its panels aligned with the panels of the box so that loads are transferred directly through the panels.

In assembling a box in accordance with the invention, the panels are arranged such that when a first panel is positioned adjacent a second panel, the locating members on the first side of the first panel are arranged in complementary positions, interposed between and aligned with the locating members on the second side of the second panel and a peg member can be inserted through the peg locating means of the locating members to hold the panels rigidly together.

In a second embodiment of the invention, the first element of the locking member preferably comprises a peg member on or adjacent the first and second sides of the wall member and the second element of the locking member comprises a plurality of collar members, the collar members each having peg locating means therethrough for fitting over the peg members.

Preferably the collar member comprises a right angled collar having two elongated peg locating means therethrough and the peg members each comprise an elongated element integrally moulded with the wall member rear face. Advantageously the peg members each have a trapezoidal cross section.

For boxes for use as access chambers, advantageously the panels may be made with one or more removable sections to allow pipes, cables and connectors, for example, to be fitted therethrough. Preferably the box when assembled can accept pipes and umbilicals from all directions by means of cut-out or punch-out portions in the panel which can be removed to make holes in desired positions.

Preferably the panels are moulded in a selection of sizes. For larger size panels, the panels may advantageously be moulded in two sections, an outer, frame section forming a wall member having a hole through the front to rear faces and an inner section which is located in the hole in the outer section by retaining elements such as integrally moulded clips. This has the advantage of enabling the amount of plastics material required in a single moulding to be reduced. The inner section may, if desired, be adapted to connect a conduit (or flexible tube), referred to as an umbilical, to the box.

The box advantageously comprises a base (or floor) panel similar to the panels forming the side walls. Alternatively, the panels may further comprise base retaining members, such as integrally moulded clips, and the box further includes a separate base panel, such that the retaining members securely hold the base panel in position. The clips may be merely lugs projecting inwardly from the panels, into the interior of the box and the base panel may be merely a flat panel resting on the lugs.

The box advantageously further comprises a lid. Advantageously it may also have retaining members for fitting a lid or have a lid fitted to an internal or external frame.

The invention further comprises a method of assembling the box of the first embodiment comprising steps of:

locating a first panel adjacent a second panel, such that the complementary locating members on the first side of the first panel are arranged alternately with the complementary locating members on the second side of the second panel; and inserting a peg member through the peg locating means of the complementary locating members to hold the panels rigidly together.

The invention further comprises a method of assembling the box of the second embodiment comprising steps of:

locating a first panel adjacent a second panel; and fitting a collar member over the peg members such that the peg locating means of the collar member fits over the peg members to hold the panels rigidly together.

The invention will now be described, by way of example only, by reference to the accompanying drawings, of which:

Figure 1A:
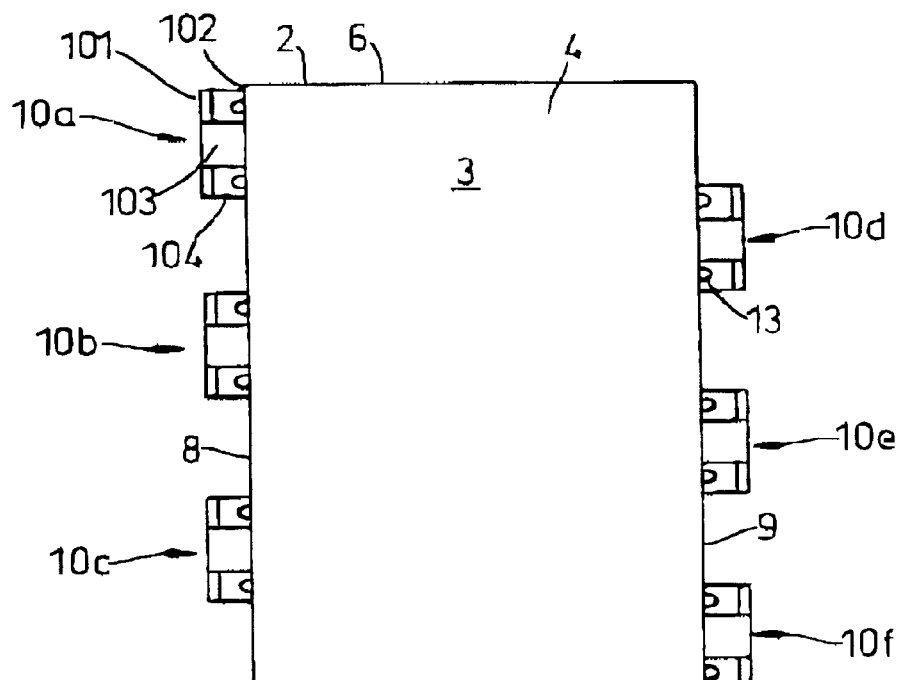
FIGS. 1a and 1b show a side view and an end view respectively of a panel of a box according to a preferred embodiment of the invention.
Figure 1B:
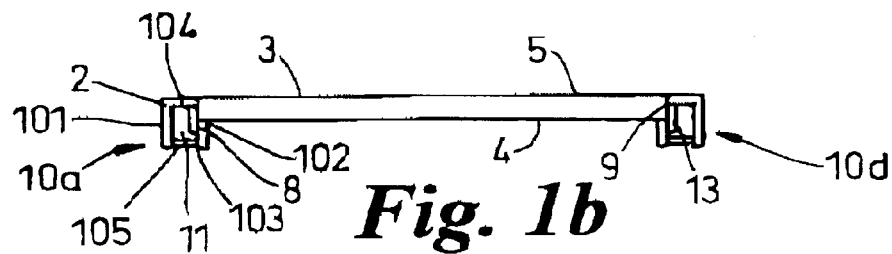
Figure 2:
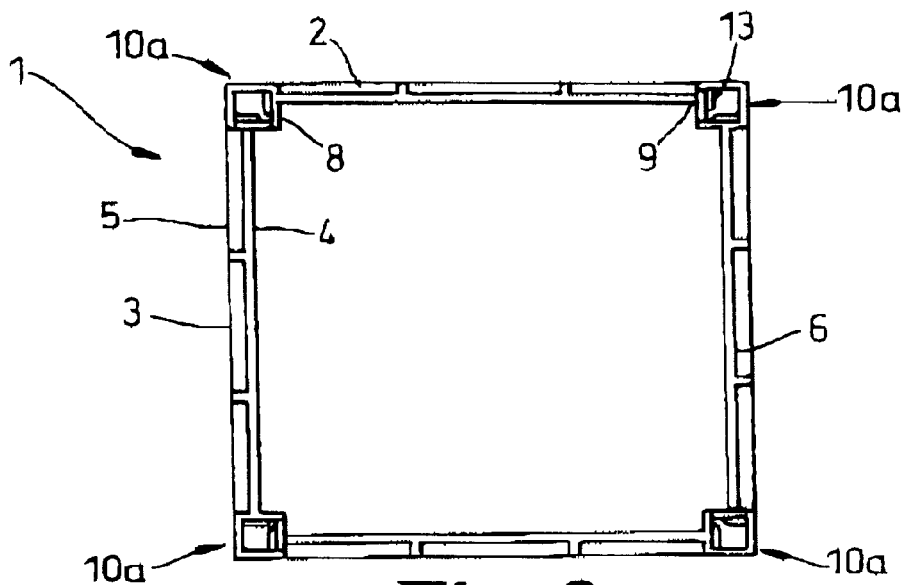
FIG. 2 shows an end view of a box assembled from panels as shown in FIG. 1.
Figure 3A:
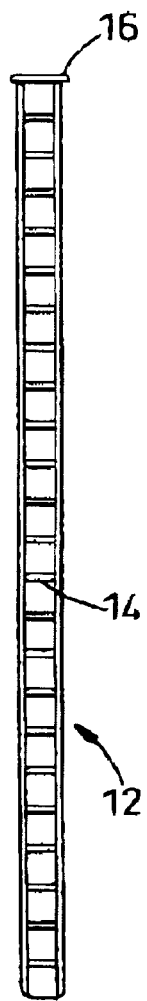
FIGS. 3a and 3b show side views of two alternative embodiments of peg members for use in the preferred embodiment of the invention.
Figure 3B:
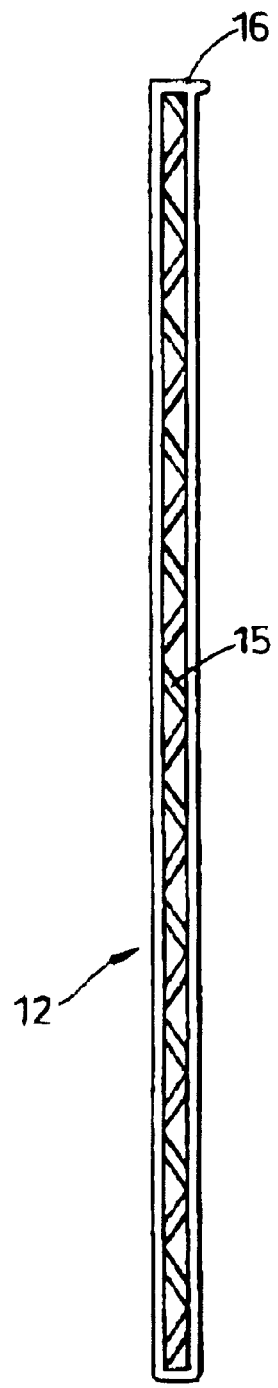

As shown in FIGS. 1 and 2, the box 1 of the invention comprises four side panels 2. The panel 2 comprises a wall member 3 having a front face 4, a rear face 5, a first side 8, a second side 9, a third side 6, normally the top, and a fourth side 7, normally the bottom. The panel 2 is injection-moulded from a suitable rigid plastics material and further comprises a plurality of complementary locating members 10a–10f integrally moulded with the first and second sides 8,9 of the wall member 3. The locating members 10 form U-shaped channels. The locating members 10 have a recess 11 through which a peg member 12 (shown in FIG. 3) is positioned to hold the locating members in position. Each locating member has two side faces 101, 102, a front face 103 and a back face 104. The front face 103 has a tab 105 integrally moulded with the side faces 101, 102 and extending across the front face 103. In the back face 104 is a cut out section 106 (shown in FIG. 4a) which corresponds to the tab 105. This arrangement has the advantage over solid locating channels, as known in the prior art, in that it enables the panel 2 to be moulded in a simple two part mould without any need for further processing to bore out the channels for pegs 12 to be inserted through.

As shown in FIG. 2, when the panels 2 are positioned adjacent one another, the locating members 10 are interposed between one another fitting together in alternate arrangement. A peg member 12 is pushed down through the space through the locating members 10 to hold the locating members rigidly in position and to therefore secure the two adjacent panels 2 together. The locating members 10 on each side of the panel 2 coact to prevent the peg 12 moving in a lateral direction.

The locating members 10 have further retaining means in the form of ridges 13 which interact with cross pieces 14 or 15 on the peg member 12. The construction is such as to allow the peg 12 to be easily pushed in. When the peg member has been inserted into the locating members 10 it is held in position by the ridges and cannot accidentally slip out.

The peg members 12 may advantageously have a cap 16 to prevent the peg 12 being inserted too far into the locating members 10.

The peg members 12 are also moulded from a suitable rigid material and act to increase the rigidity and strength of the assembled box 1, with the cross pieces 14 or 15 serving also to provide greater rigidity and strength.

The panels 2 can be moulded in a variety of sizes dependent on the size of box which is required, but they can also be moulded from a suitable single size mould, for example 150 mm×150 mm, so that different size boxes of dimensions which are multiples of the panel sizes can be made using a different number of panels 2 connected together horizontally and vertically. The panels 2 may also have locating members 10 on the top 6 and bottom 7 of the wall member, for connecting the panels 2 vertically.

Figure 4A:
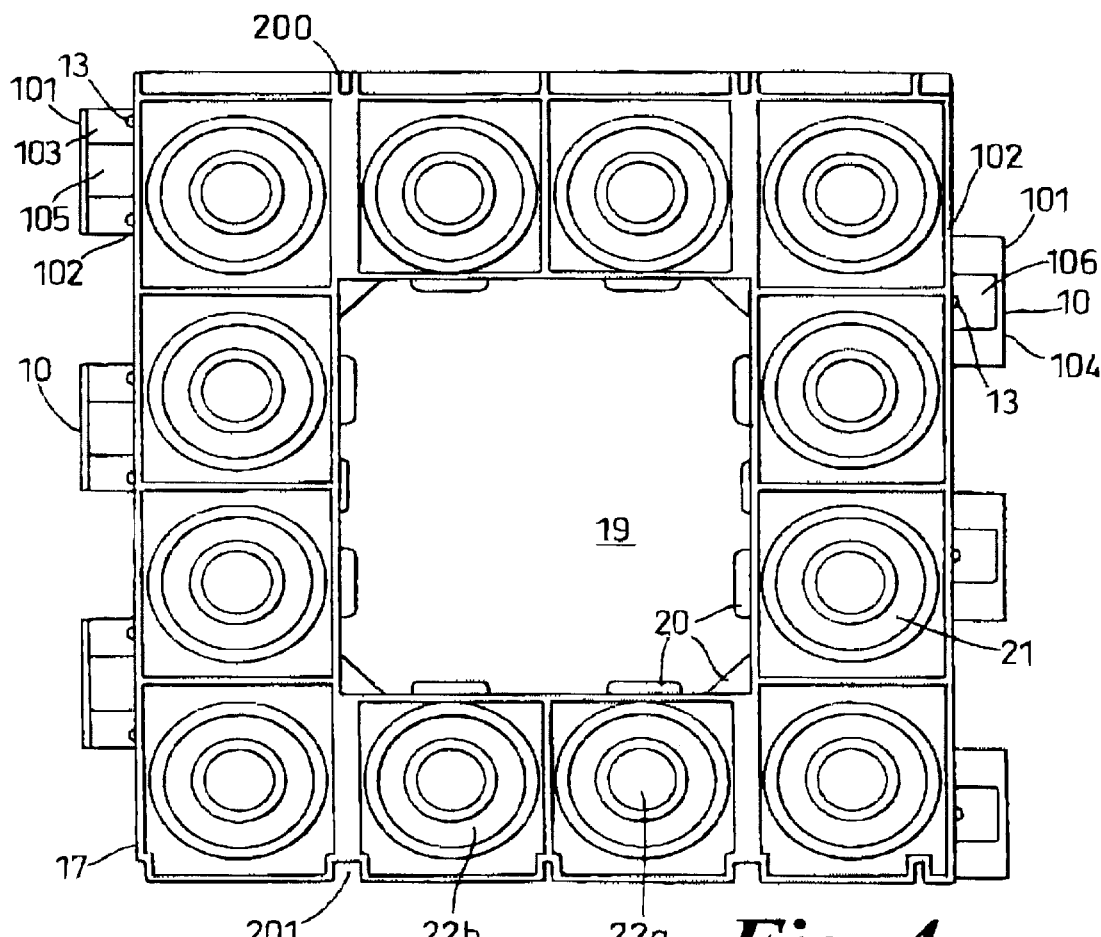
FIGS. 4a and 4b show a side view of an alternative panel and insert.
Figure 4B:
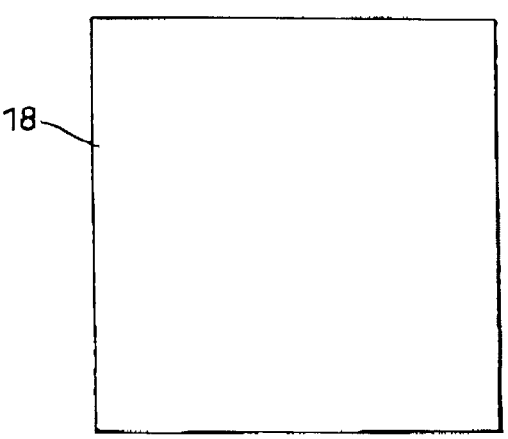

FIGS. 4a and 4b show an alterative side panel 2. This panel 2 is moulded in two sections, an outer section 17 (FIG. 4a) and an inner, insert, section 18 (FIG. 4b). The outer section 17 has a hole 19 and a plurality of retaining clips 20. The inner section 18 is placed in the hole 19 during use and is held in position by the retaining clips 20. This reduces the amount of plastics material used in a single moulding operation, which is particularly useful for larger sizes of panel 2.

A further feature shown in FIG. 4a is a plurality of removable sections 21. These are formed as cut-out sections 22a, 22b of two different sizes in the wall member 3. The smaller section 22a may be removed for, for example, allowing the insertion of cables (not shown), whereas both sections 22a, 22b may be removed to make a larger hole.

In the embodiment shown in FIG. 4a, the locating members 10 are arranged in opposite configuration with the tab 105 facing the inside of the box 1 on one side of the panel 2 and facing towards the outside of the box 1 on the other side of the panel 2. In the embodiment shown in FIG. 1, the locating members 10 are arranged in the same configuration on both sides of the panel 2, with the tabs 105 facing the inside of the box 1 when the box 1 is assembled and thus contacting the side wall 8, 9 of an adjacent panel 2 when the panels are assembled at right angles.

The panel 2 shown in FIG. 4a further includes complementary locating means of lugs 200 and slots 201 to enable the panels 2 to be arranged on top of one another.

Figure 5:
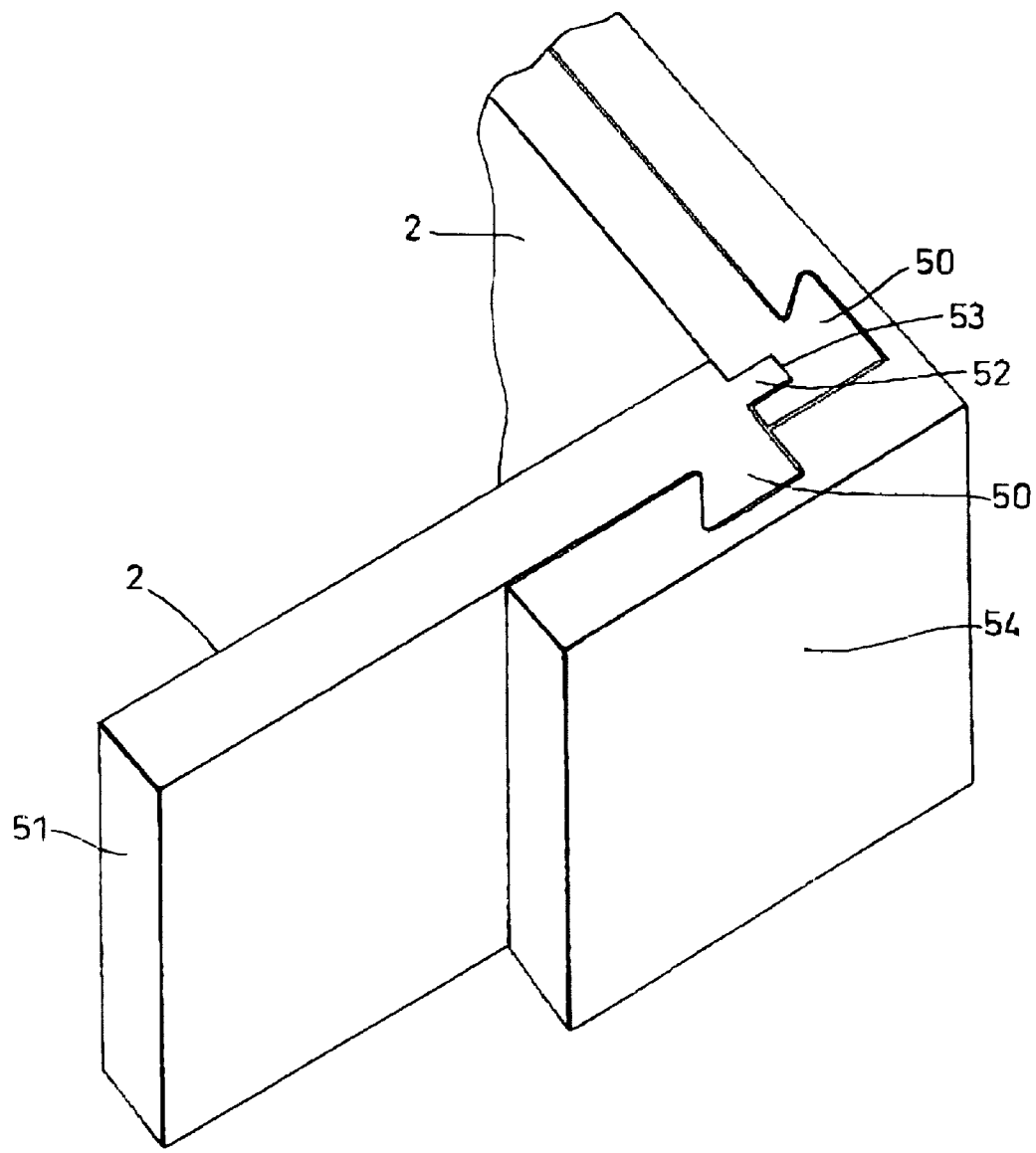
FIG. 5 shows a perspective view of an alternative embodiment of the invention.

FIG. 5 shows an alternative embodiment of the invention. In this embodiment the panels 2 comprise wall members 51 integrally moulded with peg members 50. A stud 52 on the first side 8 on one panel 2a locates in a recess 53 on the second side 9 of a second panel 2b and a moulded collar 54 slides over the peg members 50 to hold the panels 2 in position rigidly together.

A box in accordance with the present invention is stronger and more rigid than prior art boxes of equivalent size. The box of the present invention also lends itself to modular assembly, thus enabling a variety of sizes of boxes to be achieved. The corner regions are especially strengthened by the structure, in the preferred embodiment the complementary locating members butting against one another and the peg members 12 giving very high strength especially in direction of insertion of the peg members 12, thus contributing to the load bearing capability.

The box of the present invention can be moulded in a simple two part mould without additional moving parts. This makes the manufacture of the boxes simpler and cheaper than was possible for prior art boxes.

What is claimed is:

1. A flat-pack box comprising a plurality of panels moulded from plastics material and a plurality of peg members, each panel comprising:
    a wall member comprising a front face, a rear face, a top, a bottom, a first side and a second side; and
    at least one complementary locating member forming a channel for locating a peg member therein on each of the first and second sides of the wall member;
    wherein the locating members comprise a U-shaped member having a first side integrally moulded with a side of the wall member, a second side opposed to the first side, a back face and an open front face and wherein the locating member further comprises a tab integrally moulded with at least one side of the U-shaped member and extending across the open front face of the locating member and the back face has a cut out section opposed to the tab and of a least the same dimensions as the tab.

2. The box of claim 1 wherein the locating members each comprise a channel of square or rectangular cross-section.

3. The box of claim 1 wherein the tab is integrally moulded with both sides of the U-shaped member.

4. The box of claim 1 wherein the tab extends part way across the front face of the U-shaped member.

5. The box of claim 1 wherein the cut out section in the back face of the U-shaped members is larger than the tab.

6. The box of claim 1 wherein the peg members each comprise an elongate rigid member that extends through a plurality of locating members.

7. The box of claim 6 wherein the locating members further comprise peg retaining members.

8. The box of claim 7 wherein the peg retaining members comprise one or more ridges integrally moulded in the interior of the locating members.

9. The box of claim 7 wherein the peg members each comprise a plurality of cross pieces that coact with the peg retaining members to hold the peg in the locating members.

10. The box of claim 9 wherein the peg members each comprise two side pieces and a plurality of cross pieces at right angles to the side pieces.

11. The box of claim 9 wherein the peg members each comprise two side pieces and plurality of cross pieces forming triangles between the side pieces.

12. The box of claim 1 wherein one or more of the panels further comprise a plurality of complementary locating members on the top and bottom of the wall member.

13. The box of claim 1 wherein the peg members are moulded from plastics material.

14. The box of claim 1 wherein the panels are moulded with one or more removable sections.

15. The box of claim 1 wherein the panels are moulded in two sections, an outer section forming a wall member having a hole through the front to rear faces and including retaining elements, and an inner section which is located in the hole in the outer section by the retaining elements in the outer section.

16. The box of claim 1 wherein the one of the panels comprises a base panel.

17. The box of claim 1 wherein the panels further comprise base retaining members and the box further comprises a base panel.

18. The box of claim 1 further comprising a lid.

19. A pole mounting access chamber comprising a box having a plurality of panels moulded from plastics material and a plurality of peg members, each panel comprising:
    a wall member comprising a front face, a rear face, a top, a bottom, a first side and a second side; and
    at least one complementary locating member forming a channel for locating a peg member therein on each of the first and second sides of the wall member;
    wherein the locating members comprise a U-shaped member having a first side integrally moulded with a side of the wall member, a second side opposed to the first side, a back face and an open front face and wherein the locating member further comprises a tab integrally moulded with at least one side of the U-shaped member and extending across the open front face of the locating member and the back face has a cut out section opposed to the tab and of a least the same dimensions as the tab.

20. A method of assembling the box of claim 1 comprising steps of:
    locating a first panel adjacent a second panel, such that the locating members on the first side of the first panel are arranged alternately with the locating members of the second side of the second panel; and
    inserting a peg member through the peg locating means of the locating members to hold the panels rigidly together.

21. A box panel moulded from plastics material, comprising:
    a wall member comprising a front face, a rear face, a top, a bottom, a first side and a second side; and
    at least one complementary locating member forming a channel for locating a peg member therein on each of the first and second sides of the wall member;
    wherein the locating member comprises a U-shaped member having a first side integrally moulded with a side of the wall member, a second side opposed to the first side, a back face and a an open front fact and wherein the locating member further comprises a tab integrally moulded with at least one side of the U-shaped member and extending across the open front face of the locating member and the back face has a cut out section opposed to the tab and of at least the same dimensions as the tab.

* * * * *